United States Patent [19]

Bechet

[11] 4,363,023

[45] Dec. 7, 1982

[54] ELECTROMAGNETIC DEVICE FOR MEASURING THE SPEED OF HANDWRITING

[75] Inventor: Louis Bechet, Douvaine, France

[73] Assignee: Battelle Memorial Institute, Carouge, Switzerland

[21] Appl. No.: 130,165

[22] PCT Filed: Dec. 11, 1978

[86] PCT No.: PCT/CH78/00048
§ 371 Date: Aug. 9, 1979
§ 102(e) Date: Aug. 6, 1979

[87] PCT Pub. No.: WO79/00363
PCT Pub. Date: Jun. 28, 1979

[30] Foreign Application Priority Data

Dec. 9, 1977 [CH] Switzerland ............... 15018/77

[51] Int. Cl.³ ............... G06K 9/00; G08C 21/00; G01R 33/00
[52] U.S. Cl. ............... 340/146.3 SY; 178/19; 324/228
[58] Field of Search ............... 324/207, 208, 228; 178/18–20; 340/146.3 SY

[56] References Cited

U.S. PATENT DOCUMENTS 3,962,679  6/1976  Engelbrecht ............ 178/18

OTHER PUBLICATIONS

Inokuchi et al., "A New Magnetic Device for Graphic Input" Systems–Computers–Controls vol. 4, No. 1, 1973, pp. 56–60.

Primary Examiner—Gerard R. Strecker
Assistant Examiner—Walter E. Snow
Attorney, Agent, or Firm—Karl F. Ross

[57] ABSTRACT

The sensor element of this device comprises at least two electrical conductor windings ($E_x$) and ($E_y$) which are superposed. Each of these windings is shaped so as to have a rectilinear portion over at least one portion of its length and the windings are disposed so that two of their respective rectilinear portions are superposed and so that the conductors of one of these portions are at right angles to the conductors of the other portion. The area covered by these two windings constitutes the surface in which the sensor element of the device may register, at the terminals of the two windings ($E_x$) and ($E_y$), voltages ($U_y$) and ($U_y$) as a function of the magnetic field variations following the displacement of a permanent magnet rigid with the writing instrument. The signals resulting from this device may be used to identify a signature, or to transmit written characters.

1 Claim, 12 Drawing Figures

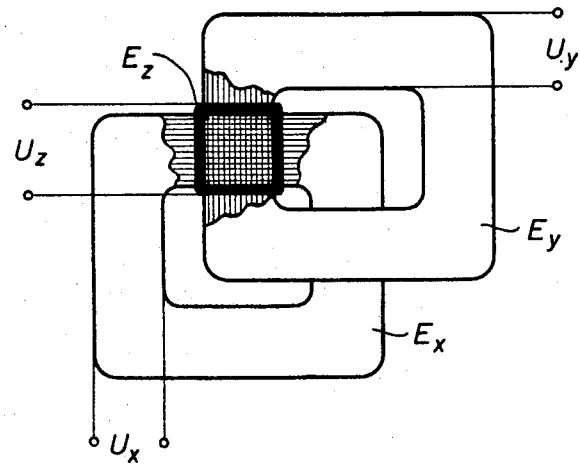
FIG. 7
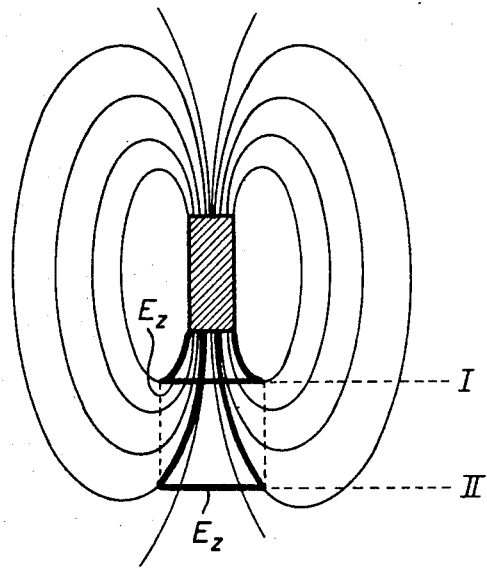
FIG. 8
FIG. 9
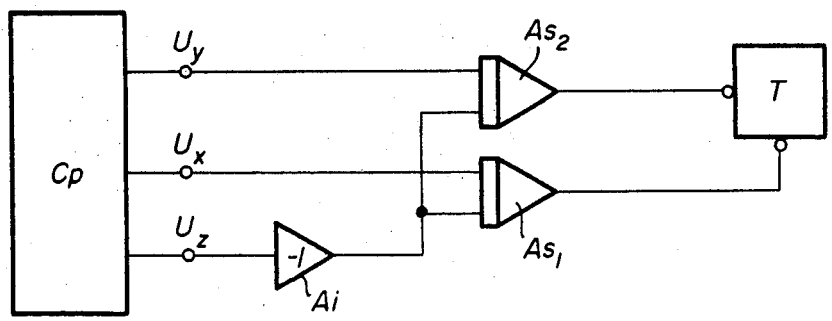

ELECTROMAGNETIC DEVICE FOR MEASURING THE SPEED OF HANDWRITING

SPECIFICATION

FIELD OF THE INVENTION

This invention relates to a device for dynamic analysis of handwriting.

BACKGROUND OF THE INVENTION

Handwriting has already been studied in a static manner by graphology. However there are cases in which graphological analysis is inadequate or liable to mistakes and a dynamic analysis of the writing must be used. This requirement is increasingly necessary in order to authenticate signatures during the endorsement or issue of a cheque for example, or for payments or withdrawals of money by means of credit cards or travellers' checks which are being used more frequently.

Various solutions have already been proposed for dynamic analysis of writing, in particular for comparing two apparently similar signatures in order to ascertain whether they have been produced by the same person.

It has already been proposed for this purpose to measure the contact pressure of the pen on the writing support, and the lateral friction between the pen and the writing support. The drawback of these two proposals is that they are strongly influenced by the type of instrument used for writing as well as by the type of writing support, so that the information obtained by these methods may show wide variations between the analysis of two signatures made by the same person under different material conditions.

It has also been proposed to measure the successive accelerations during writing by means of accelerometers fixed to the writing instrument. The drawback of this solution is due to its dependence on the spatial arrangement of the accelerometers. In effect, as the writing instrument is generally of a cylindrical form, the accelerometers may be in any position about the axis when the instrument is picked up. Consequently, the accelerations recorded may vary considerably between two signatures made by the same person.

OBJECT OF THE INVENTION

The object of the present invention is to remedy, at least partially, the above drawbacks.

SUMMARY OF THE INVENTION

For this purpose, the present invention relates to a device for measuring characteristic features of the speed of handwriting which comprises, on one hand, two superposed windings of electrical conductors lying under the surface constituting the writing support, the two ends of each winding terminating in two measuring terminals, each of these windings having a portion in which its conductors are rectilinear, the portion of rectilinear conductors of one winding being at right angles to the rectilinear portion conductors of the other winding, the respective lengths of these portions of rectilinear conductors defining the surface area of the surface of the said writing support, and, on the other hand, a magnet adjacent to the writing tip of the writing instrument, the magnetization orientation of which is generally parallel to the longitudinal axis of the said instrument and symmetrical about this axis, so that when the tip of the instrument is displaced at least in the immediate proximity of the surface of the said support, voltages are induced in these windings, as a function of the rate of variation of the field with respect to these two portions of rectilinear conductors.

BRIEF DESCRIPTION OF THE DRAWING

The attached drawing is a very diagrammatic illustration, by way of example, of devices according to the present invention. In the drawing:

FIG. 7 illustrates a variant of FIG. 2;

FIG. 8 is an explanatory diagram of the operation of this variant; and

FIG. 9 is a diagram of a circuit for processing the signal sensed by this variant.

SPECIFIC DESCRIPTION

Figure 1:
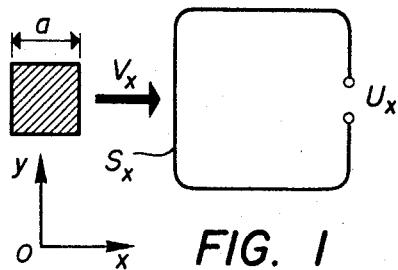
FIG. 1 is a diagram intended to explain the principle on which the device is based.

The device of the invention is based on the phenomenon of induction of an electromotive force creating a potential difference at the terminals of a winding of an electrical conductor subjected to a variation of the magnetic field which passes through it. Considering FIG. 1, which shows one turn of a conductor $S_x$ connected to two terminals between which the voltage $U_x$ is measured and a permanent magnet whose flux is $\phi$ and of which the speed of displacement along the axis $O_x$ is $V_x$ and the dimension in the direction of the speed a, when the permanent magnet traverses the edge of the turn $S_x$, the voltage recorded at the terminals of the turn, following the variation $d\phi$ of the flux $\phi$ in a time interval dt, corresponds to:

$$U_x = d\phi/dt$$

In the case in which the magnetic flux is caused by a permanent magnet whose field lines are substantially perpendicular to the plane of the turn $S_x$:

$$d\phi = \phi$$

dt corresponds to the passage time of the permanent magnet above the edge of the turn:

$$dt = a/V_x$$

Consequently:

$$U_x = (\phi/a) V_x$$

Given that $\phi$ and a are constants, $U_x$ is therefore in direct proportion to $V_x$.

Figure 2:
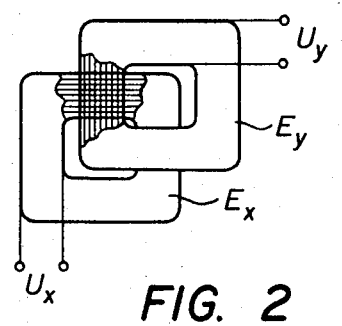
FIG. 2 is a plan view of the sensor element according to this embodiment.

FIG. 2 illustrates how, using this principle and by means of two electrical conductor windings, the components of velocity may be measured according to two orthogonal axes x,y. The sensor element of the device therefore comprises two superposed electrical conductor windings $E_x$ and $E_y$. Each of these windings is shaped so as to have a rectilinear portion over at least one portion of its length. As shown in FIG. 2, the windings $E_x$ and $E_y$ are arranged such that two of their respective rectilinear portions are superposed and such that the conductors of one of these portions are at right angles to the conductors of the other portion. The area covered by these two windings constitutes the surface in which the sensor element of the device may record, at the terminals of the two windings $E_x$ and $E_y$, the respective voltages $U_x$ and $U_y$ as a function of the magnetic field variations following the displacements of a permanent magnet over this entire surface. These two windings are designed to be disposed underneath a writing support which may be constituted by one of the faces F of a housing protecting the coils. It is understood that only the area covered by the windings constitutes the sensor, so that indicator means should be provided to indicate on the face F of the housing the boundaries of this area so that this area alone is used as the writing support.

Figure 3:
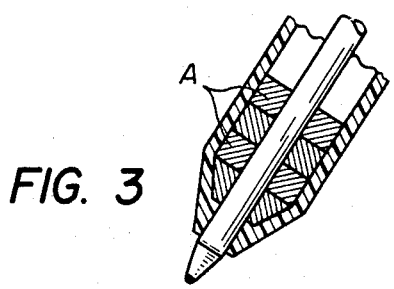
FIG. 3 is an axial cross-section of a writing instrument designed to cooperate with this sensing element.

The second element of the device is constituted by the writing instrument I shown in FIG. 3. This instrument is, for example, a ball-point pen in the casing of which annular magnets A are placed coaxial to the writing tip; these magnets A have a magnetization directed substantially along the longitudinal axis of the pen and symmetrical about this axis, so that the field lines cut the conductors forming the windings $E_x$ and $E_y$. As a result the voltages $U_x$ and $U_y$ measured at the terminals of these windings will be characteristics of the components of velocity of the magnet A rigid with the pen, in the directions $O_x$ and $O_y$.

These data relate to the speed of displacement of the magnet and not the writing tip. In this way inclination and variations of inclinations are one element of the speed of the magnet. The same applies to movements of the hand which do not directly produce a mark on the support and involve a vertical distancing of the writing instrument from the support. This is in particular the case in marking accents, bars across the letter t etc. ... which result from an interruption in writing and involve hand movement during which the writing tip is no longer in contact with the writing support.

Consequently, the voltage variations recorded are not only a function of what is written on the writing support, but also of all the rates which may modify the value of the magnetic flux cutting the coils. Five out of six degrees of freedom in space directly affect the voltage recorded at the terminals of the coils, and only the angular movements about the longitudinal axis of the writing instrument are not involved, as the magnetic field lines are symmetrical about the longitudinal axis of this instrument. This insensitivity has the advantage that the device is completely independent of its position in the user's hand. As this instrument is a body of revolution, such insensitivity to its position about its axis of rotation is important, because this position is not characteristic of the user, but is merely a chance factor.

Figure 4A:
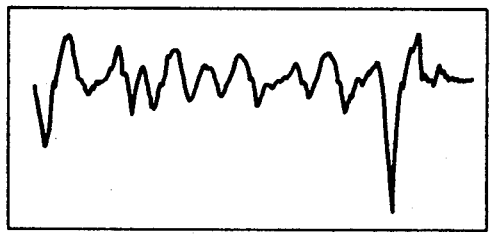
FIGS. 4a, 4b, 5a and 5b show diagrams corresponding to the voltages recorded at the terminals of the sensor element following two signatures by the same person.
Figure 4B:
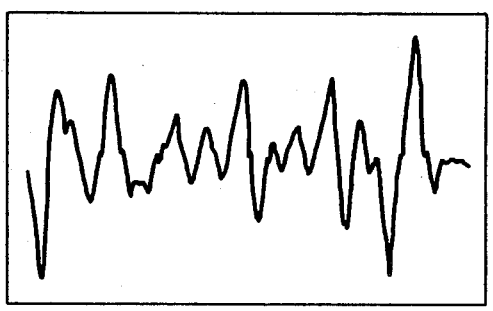
Figure 5A:
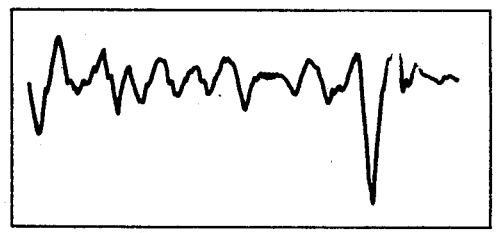
Figure 5B:
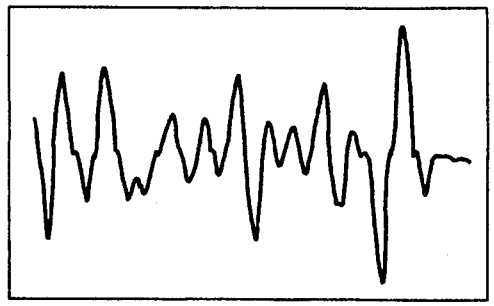

The diagrams of FIGS. 4 and 5 are recordings of signals corresponding to the voltages recorded at the terminals $U_x$ and $U_y$ for signatures. FIGS. 4a and 4b correspond to the voltages $U_x$ and $U_y$ which are characteristics of the speeds $V_x$ and $V_y$ recorded when a specific person has written his signature above the previously described sensor. FIGS. 5a and 5b correspond to the voltages $U_x$ and $U_y$ recorded when this same person wrote his signature a second time above the same sensor. It can be seen that a correlation is possible between these two signatures which may then be analysed by processing the suitable analysis signal.

Figure 6A:
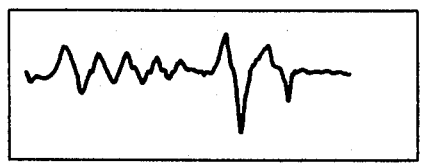
FIGS. 6a and 6b show two further diagrams relating to the signature of another person.
Figure 6B:
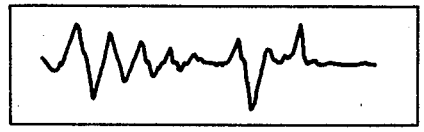

Lastly, when another person writes his signature above the same sensor, signals $U_x$ and $U_y$ shown in FIGS. 6a and 6b, are for example obtained. It is to be noted that the characteristics of these signals are completely different from those of the signals recorded in the case of FIGS. 4 and 5.

On the basis of these signals it is possible to carry out a comparative analysis for authenticating a signature with the signals registered during a previous signature of the same individual and thus constituting the reference signature.

The variant illustrated in FIG. 7 comprises, in addition to the superposed conductor windings $E_x$ and $E_y$, a third conductor winding $E_z$ in the form of a frame, and which surrounds the entire overlapping area of the conductors $E_x$ and $E_y$ which constitutes the detection zone of the sensor. The frame formed by the third winding $E_z$ serves to measure the magnetic flux variations covered by the overlapping area of the conductors $E_x$ and $E_y$, following the displacements perpendicular to the plane of these windings. In effect, considering FIG. 8, it may be seen that the magnetic flux tube resulting from a magnet A, contained by the winding $E_z$ at the level I, with its short fat flared horn shape shown by the heavy lines extending downward from the magnet to the horizontal dashed line I, is higher (i.e. it comprises more flux) than that contained by this same winding at level II, with its long thin flared horn shape shown by the heavy lines extending downward from the magnet to the horizontal dashed line II.

Therefore the component of movement of the writing instrument perpendicular to the plane of the windings $E_x$, $E_y$, and $E_z$ induces a voltage in each winding. Components of movement in the plane of the windings, however, do not induce any net voltage in the winding $E_z$, because any voltage that would tend to be induced at one side of the frame is opposed by a substantially equal one at the opposite side. So any voltage induced in the windings $E_x$ and $E_y$ by movement of the writing instrument perpendicular to the writing plane can be substantially cancelled by subtracting therefrom the voltage similarly induced in the winding $E_z$; and the voltages induced in the windings $E_x$ and $E_y$ by movement of the writing instrument in the writing plane remain substantially unaffected.

The diagram of FIG. 9 shows a circuit for processing the three signals $U_x$, $U_y$ and $U_z$ in which the voltages induced at the terminals of the winding $E_z$ are subtracted from those induced at the terminals of the windings $E_x$ and $E_y$ so as to record a signal which is independent of movements located outside the writing plane. This circuit comprises, at the outputs $U_x$, $U_y$, and $U_z$ of the sensor $C_p$, an inverter amplifier Ai connected to the output $U_z$ and two integrator adder amplifiers $As_1$ and $As_2$ connected on one hand to the outputs $U_x$ and $U_y$ and, on the other hand, to the output of the inverter amplifier Ai. The outputs of these integrator amplifiers are themselves connected to the two inputs of a tracer T having x and y coordinates.

By means of the described sensor and amplifier circuit, the tracer T will only reproduce the movements located in the writing plane, i.e. the writing and not the movements of the writing instrument located outside of the writing plane which do not therefore correspond to writing but are required to mark accents or dots above letters for example. A sensor of this type may in particular be used to carry out the transmission of written characters.

POSSIBILITIES OF INDUSTRIAL USE

The invention is particularly applicable to the field of identification of writing, in particular signatures, in the transmission of written characters and in the transmission of any written sign.

I claim:

1. Apparatus for measuring the relative speed of handwriting in a predetermined writing area on a writing support surface, comprising:
- a writing instrument having therein a longitudinal axis, a writing tip at one end thereof, and means for providing a magnetic flux directed substantially parallel and adjacent to the axis;
- a first electrically conductive winding comprising a plurality of turns below the writing support surface having a selected portion in which the conductors are substantially in a plane adjacent and parallel to the writing area, extend in substantially straight lines across the writing area in a first direction, and are substantially evenly distributed across the writing area in a second direction that is substantially perpendicular to the first direction, with the rest of the winding extending away from the vicinity of the writing area;
- a second electrically conductive winding comprising a plurality of turns below the writing support surface having a selected portion in which the conductors are substantially in a plane adjacent and parallel to the writing area, extend in substantially straight lines across the writing area in the second direction, and are substantially evenly distributed across the writing area in the first direction, with the rest of the winding extending away from the vicinity of the writing area;
- the selected portions of first and second windings thus forming a substantially rectangular grid adjacent and parallel to the writing area and substantially coextensive therewith;
- so that, when the writing tip is moved in the proximity of the writing area, voltages are induced in the windings by the variations in magnetic flux across the selected portions of the windings responsive to the speed of the movement;
- means responsive to the voltage across each winding for indicating the relative speed of the writing tip, the magnetic flux providing means comprising an annular magnet positioned substantially coaxial with the writing tip around the longitudinal axis of the writing instrument; and
- a third electrically conductive winding comprising a plurality of turns below the writing support surface substantially in a plane adjacent and parallel to the writing area and extending around the writing area; so that, when the writing tip is moved in the proximity of the writing area in a direction having a component of movement perpendicular to the plane of the third winding, voltage is induced in the third winding by the variation in magnetic flux across it responsive to the speed of the movement component perpendicular to the plane of the writing area; and means for connecting the voltage across the third winding to the voltage responsive means, in opposition to the voltage across the first winding, and in opposition to the voltage across the second winding.

* * * * *